United States Patent
Weng et al.

(10) Patent No.: US 8,412,866 B2
(45) Date of Patent: Apr. 2, 2013

(54) SYSTEM AND METHOD OF DYNAMICALLY SWITCHING QUEUE THRESHOLD

(75) Inventors: Chih-Hao Weng, Taipei (TW); Ta-Jung Yeh, Taipei (TW)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 1152 days.

(21) Appl. No.: 12/276,543

(22) Filed: Nov. 24, 2008

(65) Prior Publication Data

US 2010/0131783 A1    May 27, 2010

(51) Int. Cl.
*G06F 5/00* (2006.01)
*G06F 1/32* (2006.01)

(52) U.S. Cl. .......................................... 710/52; 713/320
(58) Field of Classification Search .................... 710/52, 710/53, 56; 713/300–340
See application file for complete search history.

(56) References Cited

U.S. PATENT DOCUMENTS

| | | | | |
|---|---|---|---|---|
| 5,210,829 | A * | 5/1993 | Bitner ............................ | 710/57 |
| 5,771,356 | A | 6/1998 | Leger et al. | |
| 6,865,653 | B2 * | 3/2005 | Zaccarin et al. .............. | 711/154 |
| 7,269,752 | B2 * | 9/2007 | John .............................. | 713/324 |
| 7,343,502 | B2 * | 3/2008 | Samson et al. ................ | 713/320 |
| 7,584,312 | B2 * | 9/2009 | Kuroda et al. ................. | 710/52 |
| 7,620,833 | B2 * | 11/2009 | Gan et al. ...................... | 713/324 |
| 7,865,747 | B2 * | 1/2011 | Buyuktosunoglu et al. .. | 713/320 |
| 8,004,697 | B2 * | 8/2011 | Bosseler ........................ | 358/1.13 |
| 8,046,597 | B2 * | 10/2011 | Dawkins et al. .............. | 713/300 |
| 8,112,646 | B2 * | 2/2012 | Tsai ................................ | 713/320 |
| 2003/0093702 | A1 * | 5/2003 | Luo et al. ....................... | 713/320 |
| 2003/0131269 | A1 * | 7/2003 | Mizyuabu et al. ............. | 713/320 |
| 2004/0073692 | A1 * | 4/2004 | Gentle et al. .................. | 709/231 |
| 2004/0139359 | A1 * | 7/2004 | Samson et al. ................ | 713/320 |
| 2005/0180443 | A1 * | 8/2005 | Schulz et al. .................. | 370/412 |
| 2006/0020835 | A1 * | 1/2006 | Samson et al. ................ | 713/300 |
| 2007/0076733 | A1 * | 4/2007 | Bosseler ........................ | 370/412 |
| 2008/0005405 | A1 * | 1/2008 | Innis et al. ..................... | 710/56 |
| 2009/0077394 | A1 * | 3/2009 | Tsai et al. ...................... | 713/310 |
| 2009/0077395 | A1 * | 3/2009 | Tsai ................................ | 713/310 |
| 2009/0077396 | A1 * | 3/2009 | Tsai et al. ...................... | 713/310 |
| 2009/0077401 | A1 * | 3/2009 | Tsai ................................ | 713/320 |

OTHER PUBLICATIONS

Intel Corporation, "High Definition Audio Specification" Revision 1.0, Apr. 15, 2004.
Taiwan Office Action issued Jun. 29, 2012.

* cited by examiner

*Primary Examiner* — Paul R Myers
*Assistant Examiner* — Trisha Vu
(74) *Attorney, Agent, or Firm* — McClure, Qualey & Rodack, LLP

(57) ABSTRACT

A system and method of dynamically switching the threshold of a data queue, such as FIFO, is disclosed. The data queue has a first threshold and a second threshold, wherein the first threshold is greater than the second threshold. The data queue is dynamically switched between the first threshold and the second threshold according to different power state of a central processing unit (CPU). A system memory is requested to fill the data queue with data whenever amount of the data queue is less than the switched first/second threshold.

16 Claims, 6 Drawing Sheets

SYSTEM AND METHOD OF DYNAMICALLY SWITCHING QUEUE THRESHOLD

BACKGROUND OF THE INVENTION

1. Field of the Invention

The present invention generally relates to power management, and more particularly to a system and method of dynamically switching the threshold of a first-in first-out (FIFO) buffer.

2. Description of the Prior Art

Intel released the High Definition Audio (HDA) specification in 2004. The specification is documented in the Intel® High Definition Audio Specification, Revision 1.0 and subsequent revision(s) (http://www.intel.com/standards/hdaudio/), the disclosure of which is hereby incorporated by reference.

FIG. 1 illustrates a block diagram of the HDA architecture. A central processing unit (CPU) 10 is connected, via a host bus 11, to a memory controller 12, which controls the access of one or more system memories 13. The memory controller 12 is connected, via a system bus (such as Peripheral Component Interconnect or PCI) 14, to a HDA controller ("HDAC") 15. The HDAC 15 is further connected to one or more coder/decoder (codec) 17 via a HDA link 16. The HDA controller 15 includes one or more direct memory access (DMA) engines or controllers (the "DMA") 150, which control the stream data transportation between the system memory 13 and the codecs 17. The HDA link 16 facilitates the transportation of control signals and data between the HDAC 15 and the codecs 17. Each codec 17 includes one or more converters ("C"), which convert output digital signal into analog form to an output device (such as speaker), or convert received analog signal into digital form from an input device (such as microphone).

The DMA 150 has a queue, such as a first-in first-out buffer ("FIFO") for maintaining the stream on the HDA link 16 by storing sufficient amount of data, such that no data under run or overrun occurs. Before sending out data to the HDA link 16, the HDAC 15 will issue a bus master cycle to request next stream data from the system memory 13 whenever the amount of the stream data in the FIFO is less than a threshold value. The FIFO threshold value and the burst length are associated with the FIFO size, as shown in Table 1, where h represents a hexadecimal number, and DW represents a double word (or 4-byte data).

TABLE 1

| FIFO size | FIFO threshold | Burst length |
|---|---|---|
| 40h DW | 31h DW | 10h DW |
| 30h DW | 21h DW | 10h DW |
| 20h DW | 19h DW | 8h DW |
| 10h DW | dh DW | 4h DW |
| 8h DW | 7h DW | 2h DW |
| 4h DW | 4h DW | 1h DW |
| Others | 4h DW | 1h DW |

The FIFO threshold value is utilized to make the HDAC 15 be aware of the time to issue a bus master cycle to retrieve data of the system memory 13 for playback or to send back data to the system memory 13 for recording. The FIFO threshold, accordingly, provides tolerance capability that prevents data under run or overrun.

FIG. 2 illustrates an exemplary FIFO which has a FIFO size of 192 bytes, and a threshold value of 128 bytes. Taking 48 kHz sample rate, 2 channels each having 16 bits (or 2 bytes) for example, each frame thus contains 4 bytes of data, wherein each frame is regarded as a "data unit of transportation." Whenever the amount of stream data in the FIFO is less than 128 bytes (i.e., the threshold), the HDAC 15 will issue a bus mater cycle. As each frame is transported in an interval time of 20.83 micro second (μs) ($=1/(48\times10^3)$), which is regarded as a "time unit of transportation," the 128 bytes therefore can keep 32 frames (=128/4) of data for about 666 micro second (=32×20.83) without under run.

In the HDA system of FIG. 1, input/output devices such as speakers, headsets, modems or microphones are connected to the HDAC 15 via codecs 17. Data transportation takes place through the HDA link 16 according to some control signals. For example, a serial digital output signal (AZSDO) is used to send serial formatted data to the output device; a serial digital input signal (AZSDI) is used to receive serial formatted data from the input device; a synchronization signal (SYNC) driven by the HDAC 15 is used for frame synchronization and outbound tag signaling; a reset signal (AZRST#) is used to reset the HDA link 16; and a clock signal (AZBITCLK) provides 24 MHz clock source.

When a HDA driver requests the HDAC 15 and sets an associated RUN bit, the DMA 150 of the HDAC 15 then communicates with the codec 17 during playback, recording, command outbound ring buffer (CORB) sequence or response inbound ring buffer (RIRB) sequence.

The power management unit (PMU) 18 in FIG. 1 controls the power state Cx of the CPU 10. Hewlett-Packard, Intel and other companies co-developed an Advanced Configuration and Power Interface (ACPI) specification, which may be found at http://www.acpi.info/, the disclosure of which is hereby incorporated by reference. According to the ACPI, C0 power state is a state in which the system operates normally, and C1 through Cn power states are various sleeping states, where larger n indicates greater degree of idleness and power saving. The system may continue accessing the system memory 13 during C2 or below, while the system can no longer access the system memory 13 during C3 or above. In other words, whenever the CPU 10 is in C4 and the amount of data in the FIFO is less than the threshold, the CPU 10 requests data from the system memory 13 after changing from C4 to C2. Likewise, whenever the CPU 10 is in C3 and the amount of data in the FIFO is less than the threshold, the CPU 10 requests data from the system memory 13 after changing from C3 to C2.

The HDAC 15 and the codec 17 may request a master or interrupt event during Cx sleeping state without software triggering. In this situation, the codec 17 drives AZSDI pin to signal the HDAC 15 for master or interrupt request. The signal AZSDI can be latched by the PMU 18 as a power management event (PME) to make the CPU 10 out of Cx state.

FIG. 3 illustrates a flow diagram demonstrating how the HDA system enters and exits sleeping state. At the beginning, the PMU 18 issues a signal to force the CPU 10 into C3 or C4 state (step 30). Next, in step 31, the HDAC RUN bit is checked. If the RUN bit is inactive, the CPU 10 is in C3/C4 state (step 32A). Meanwhile, the HDA link 16 is in reset state (step 33A), which hides the codec 17 such that the HDA link 16 does not function. Subsequently, in step 34A, if the HDAC 15 detects active signal AZSDI, the CPU 10 will exit from C3/C4 into C0/C2 (step 35); otherwise, if the HDAC 15 detects inactive signal AZSDI, the CPU 10 will remain in C3/C4 (i.e., the step 32A).

If the RUN bit in the step 31 is active, the CPU 10 is in C3/C4 state (step 32B). Meanwhile, the HDA link 16 exits the reset state (step 33B), which uncovers the codec 17 such that the HDA link 16 can function. Subsequently, in step 34B, if the HDAC 15 detects active signal AZSDI or the amount of the FIFO is less than the threshold, the CPU 10 will exit from C3/C4 into C0/C2 (step 35); otherwise, the CPU 10 will remain in C3/C4 (i.e., the step 32B).

When the CPU 10 is in the C3/C4 state, the devices are apt to get bus master cycle. According, it is not necessary to prepare too much data in the FIFO buffer for playback or recording. Conventional HDA system, either in C3/C4 state or C0/C2 state, adapts fixed threshold value, which causes the CPU 10 to frequently exit from C3/C4 into C0/C2. For the reason that conventional HDA system could not effectively change between sleeping states to save power, a need has arisen to propose a novel control mechanism for saving more power to lengthen the operating time of a portable electronic device with limited power supply.

SUMMARY OF THE INVENTION

In view of the foregoing, it is an object of the present invention to provide a system and method of dynamically switching threshold of a data queue (e.g., FIFO) for effectively saving power.

According to one embodiment, a data queue, such as a first-in first-out buffer (FIFO), has a first threshold and a second threshold, wherein the first threshold is greater than the second threshold. The data queue is dynamically switched between the first threshold and the second threshold according to different power state of a central processing unit (CPU). For example, the data queue is changed from the first threshold to the second threshold when the CPU changes from a first power state to a more power-saving second power state. Alternatively, the data queue is changed from the second threshold to the first threshold when the CPU changes from the second power state to the first power state. A system memory is requested to fill the data queue with data whenever amount of the data queue is less than the switched first/second threshold.

DETAILED DESCRIPTION OF THE INVENTION

Figure 5A:
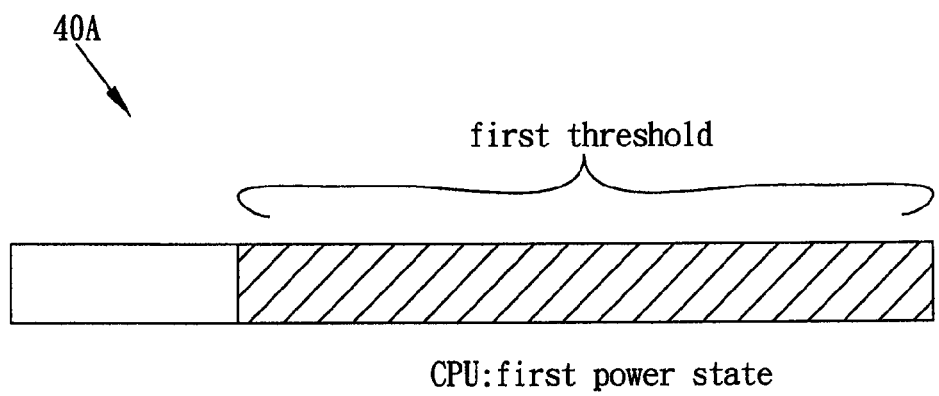
FIG. 5A illustrates the invention concept of dynamically switching queue threshold according to the present invention.
Figure 5A:
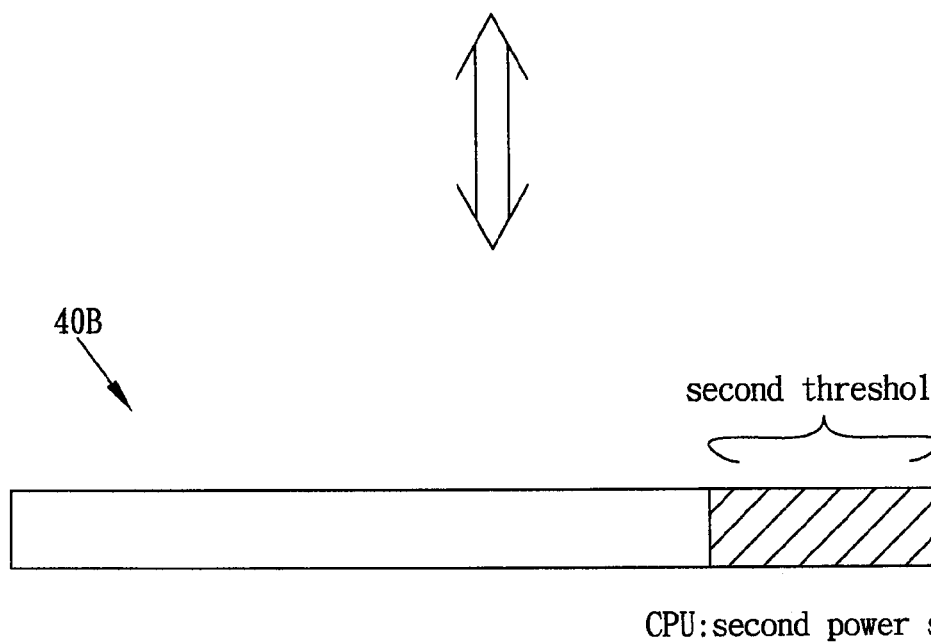

FIG. 5A illustrates the invention concept of dynamically switching queue threshold according to the present invention. A data queue 40A and another data queue 40B have a first threshold and a second threshold respectively, where the first threshold is greater than the second threshold. The threshold value is dynamically switched between the first threshold and the second threshold according to the power state of the CPU. Specifically, as shown in the figure, the threshold value is switched from the first threshold of the queue 40A into the second threshold of the queue 40B, when the CPU is changed from the first power state to the more power-saving second power state.

Figure 1:
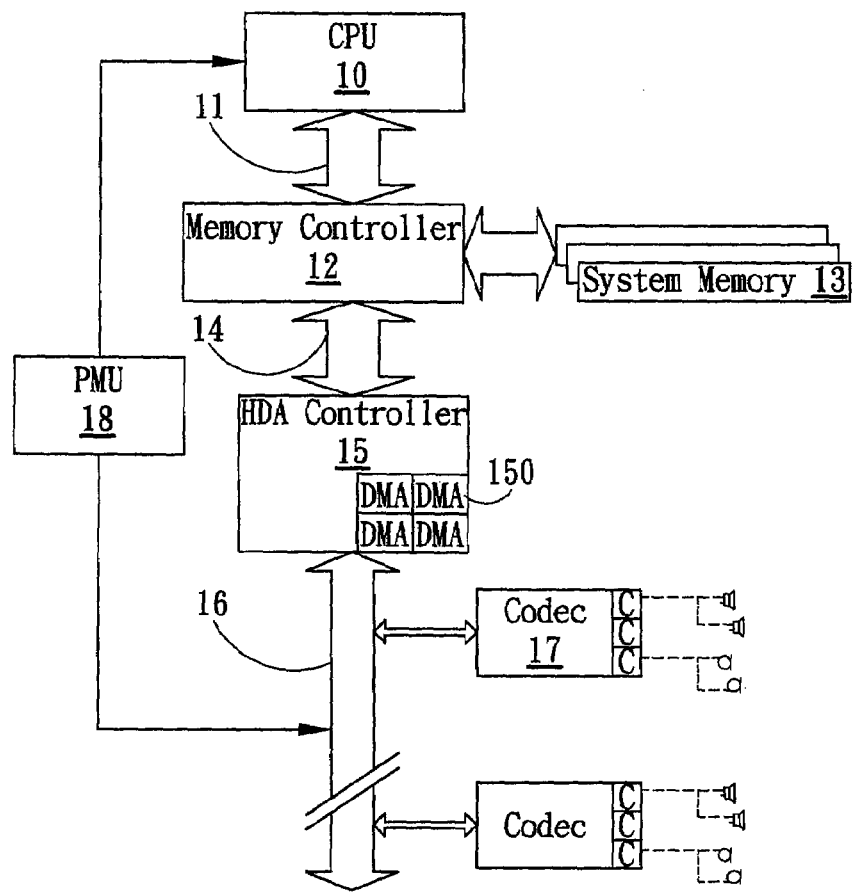
FIG. 1 illustrates a block diagram of the HDA architecture.
Figure 2:
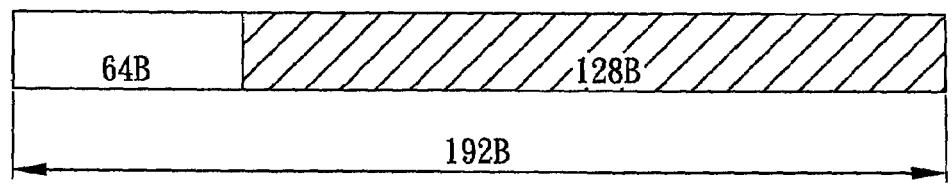
FIG. 2 illustrates an exemplary FIFO which has a FIFO size of 192 bytes, and a threshold value of 128 bytes.
Figure 4:
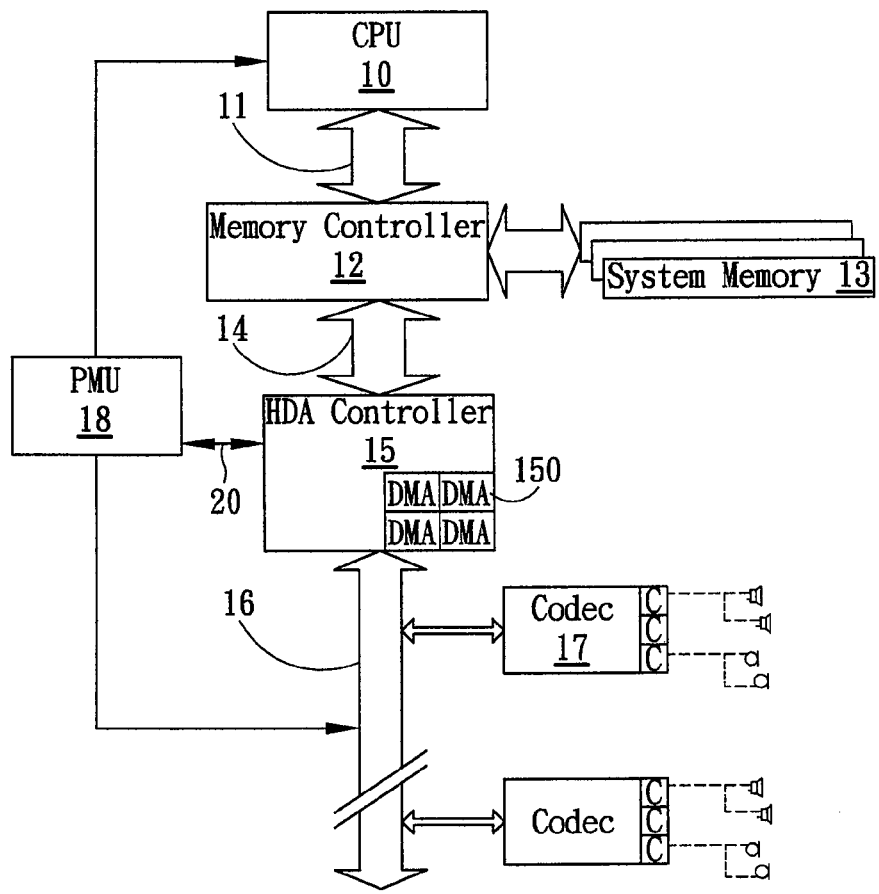
FIG. 4 illustrates a block diagram of the HDA architecture according to one embodiment of the present invention.
Figure 5B:
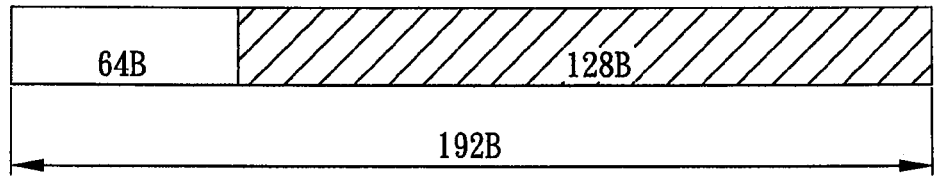
FIG. 5B and FIG. 5C illustrate a first-in first-out (FIFO) buffer capable of being dynamically switching its threshold value according to one embodiment of the present invention.
Figure 5C:
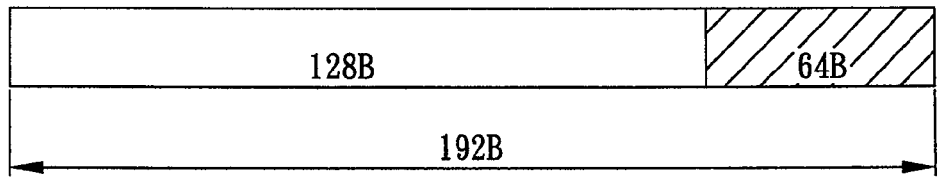

FIG. 4 illustrates a block diagram of the HDA architecture according to one embodiment of the present invention; FIG. 5B and FIG. 5C illustrate a first-in first-out (FIFO) buffer capable of being dynamically switching its threshold value according to one embodiment of the present invention. As the present embodiment is exemplified by a high definition audio (HDA) system, the block diagram of HDA system and reference numerals illustrated in FIG. 1 are partially adopted by the embodiment in FIG. 4. The present invention is not limited to the HDA system, but is well adaptable to other audio system, video system or a data input/output system in general, such as the Integrated Device Electronic (IDE), the Serial Advanced Technology Attachment (SATA) or the Universal Serial Bus (USB).

In the embodiment, the data queue has the first threshold when the CPU 10 is in the C0/C2 state (FIG. 5B); alternatively, the data queue has the second threshold (which is less than the first threshold) when the CPU 10 is in the C3/C4 state (FIG. 5C). The power states C0, C2, C3 and C4 are defined in Advanced Configuration and Power Interface (ACPI) specification. The power state of the CPU 10 is controlled by the power management unit (PMU) 18.

The embodiment is exemplified by a data format with 48 kHz sample rate and 2 channels each having 16 bits (or 2 bytes), and each frame thus contains 4 bytes of data. In one exemplary embodiment, each frame is regarded as, but not limited to, a "data unit of transportation." In another exemplary embodiment, for example in a USB system, a "data unit of transportation" is the amount of data transported within a transaction. With respect to the FIFO of FIG. 5B, whenever the HDA controller ("HDAC") 15 consumes more than 64 bytes of data (in other words, the amount of stream data in the FIFO is less than 128 bytes (i.e., the threshold)), the CPU 10 will exit C3/C4 state and issue a bus mater cycle. As each frame is transported in an interval time of 20.83 micro second ($\mu s$) ($=1/(48 \times 10^3)$), which is regarded as a "time unit of transportation" or the time required to transport a "data unit of transportation," the 64 bytes of data therefore can keep the CPU 10 staying in C3/C4 for a period of 16 frames ($=64/4$) of data or, equivalently, about 333.28 micro second ($=16 \times 20.83$).

With respect to the FIFO of FIG. 5C, the threshold is changed from 128 bytes ("the first threshold") in FIG. 5B into 64 bytes ("the second threshold") in FIG. 5C. For the same exemplary data format (i.e., 48 kHz sample rate and 2 channels each having 16 bits (or 2 bytes)), whenever the HDAC 15 consumes more than 128 bytes of data (in other words, the amount of stream data in the FIFO is less than 64 bytes (i.e., the second threshold)), the CPU 10 will exit C3/C4 state and issue a bus mater cycle. As each frame is transported in an interval time of 20.83 micro second ($=1/(48 \times 10^3)$), the 128 bytes of data therefore can keep the CPU 10 staying in C3/C4 for a period of 32 frames ($=128/4$) of data (i.e., the time required to transport thirty-two (32) "data units of transportation" or, equivalently, about 666.56 micro second ($=32 \times 20.83$). Compared to the FIFO of FIG. 5A, the FIFO of FIG. 5B provides additional 333.28 micro second ($=666.56-333.28$) to keep the CPU 10 staying in C3/C4 state.

As the CPU 10 takes time to change from Cx state (x greater than or equal to 3) to C2 state, the FIFO must keep sufficient amount of data to prevent under run or overrun during this time. For this reason, the new second threshold should be set to accommodate the time of the state change.

Figure 6:
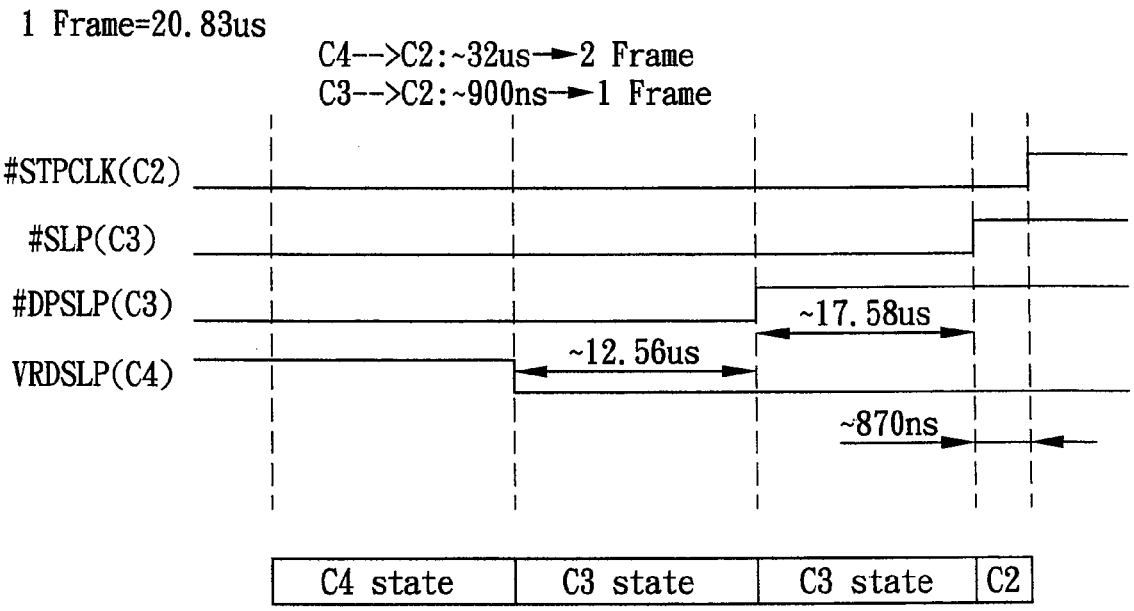
FIG. 6 illustrates exemplary signal waveforms demonstrating state change from C4 to C3 and then to C2 state.

FIG. 6 illustrates exemplary signal waveforms demonstrating state change from C4 to C3 and then to C2 state. According to the figure, the CPU 10 takes 30.14 micro second (=12.56+17.58) to change from C4 to C3 state, and further takes 870 nano second (ns) to change from C3 to C2 state. That is, the CPU 10 totally takes about 32 micro second to change from C4 to C2 state. If the frame interval time of 20.83 micro second is defined as one "time unit of transportation," the example illustrated in FIG. 6 therefore requires at least two time units of transportation to handle the state change. Equivalently speaking, the second threshold should be set to a value not less than two data units of transportation. For the same data format as discussed above, i.e., 48 kHz sample rate and 2 channels each having 16 bits (or 2 bytes), the two time units of transportation are equivalent to 8 bytes (or two data units of transportation). Furthermore, for fault tolerance requirement, additional data unit or data units of transportation are usually added as safety frame(s). For example, if it is probable that the time taken to change from C4 to C2 state may exceed 41.66 micro second (or two time units of transportation), one or more safety frames of data units of transportation should be added to prevent under run or overrun.

In the embodiment, the second threshold may be derived by the following equation:

second threshold=(data unit of transportation)*[(time required to change from the second/first state into the first/second state)/(time unit of transportation)]+n*(data unit of transportation)

where integer n is not less than 0, which, in one embodiment, may be controlled by three bits of a register, and n may be any integer between 0 and 7 inclusively. The safety frames mentioned above is equal to n*(data unit of transportation) in the above equation, where n may be adjusted according to applications. The second threshold either adding the safety frame(s) (i.e., n≠0) or not adding the safety frame (i.e., n=0) should not be greater than the first threshold. Moreover, in one embodiment, if the calculated value of [(time required to change from the second/first state into the first/second state)/(time unit of transportation)] in the above equation is not an integer, one (1) is then added to the calculated quotient to prevent the under run or overrun. In addition, (time required to change from the second/first state into the first/second state) indicates a time required to change from the first state into the second state, or a time required to change from the second state into the first state. Further, the unit of the first threshold or the second threshold may be bit, byte or other unit.

Figure 7:
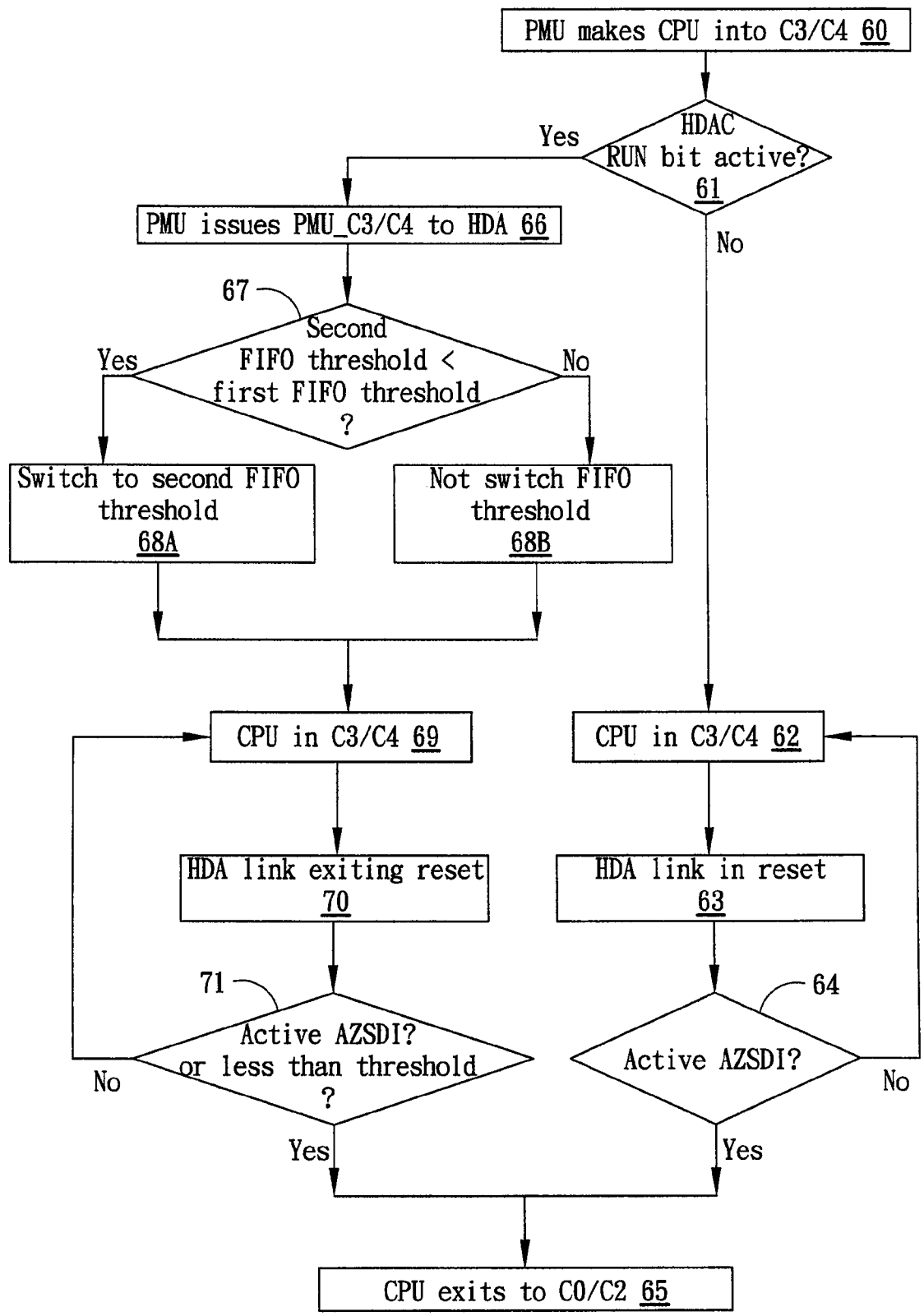
FIG. 7 illustrates a flow diagram of dynamically switching FIFO threshold according to one embodiment of the present invention.

FIG. 7 illustrates a flow diagram of dynamically switching FIFO threshold according to one embodiment of the present invention. At the beginning, the power management unit (PMU) 18 issues a signal to force the CPU 10 into C3 or C4 state (step 60). Next, in step 61, the HDAC RUN bit is checked. If the RUN bit is inactive, the CPU 10 is in C3/C4 state (step 62). Meanwhile, the HDA link 16 is in reset state (step 63), which hides the codec 17 such that the HDA link 16 does not function. Subsequently, in step 64, if the HDAC 15 detects active signal AZSDI, the CPU 10 will exit from C3/C4 into C0/C2 (step 65); otherwise, if the HDAC 15 detects inactive signal AZSDI, the CPU 10 will remain in C3/C4 (i.e., the step 62).

Figure 3:
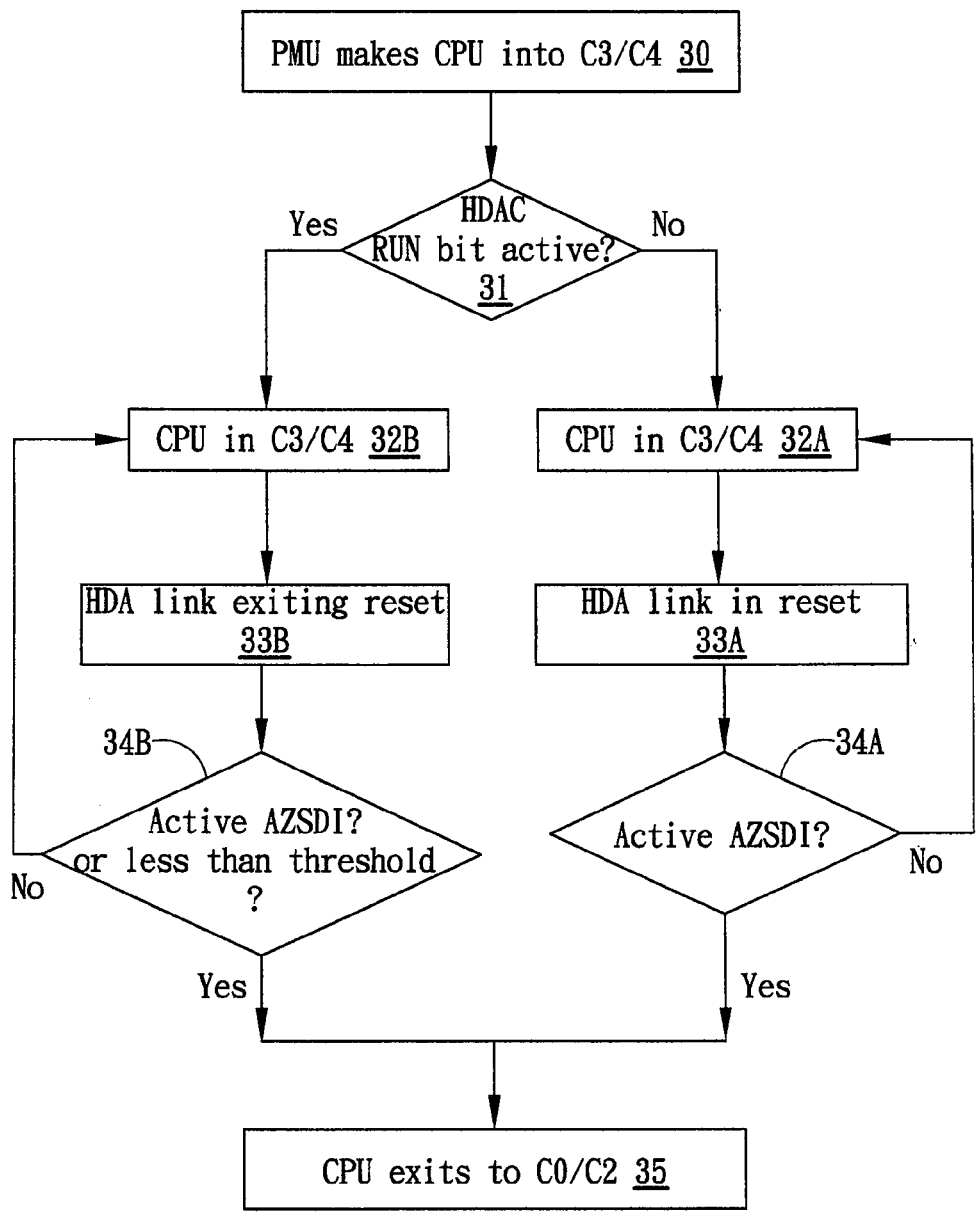
FIG. 3 illustrates a flow diagram demonstrating how the HDA system enters and exits sleeping state.

If the RUN bit in the step 61 is active, the PMU 18 issues a signal PMU_C3/C4 (such as the signal #DPSLP(C3) in FIG. 6) to notify the HDAC 15 of the current power state (step 66). The notification is taken place through a connection (such as a conductive wire 20) coupled between the HDAC 15 and the PMU 18. Compared to the conventional system (FIG. 3), the HDAC 15 of the present embodiment is capable of detecting the current power state of the CPU 10 by referring the signal situation in PMU with the conductive wire 20. For example the signal #DPSLP(C3), #SLP(C3) or VRDSLP(C4) of FIG. 6 with high voltage level indicates the CPU 10 in C3 or C4 state; the signal #DPSLP(C3), #SLP(C3) or VRDSLP(C4) of FIG. 6 with low voltage level indicates the CPU 10 not in C3 or C4 state. On the other hand, the conventional system is incapable of such detection.

Subsequently, the newly set threshold FIFO threshold (that is, the threshold for C3/C4 as exemplified in FIG. 5C) is compared with the first FIFO threshold (that is, the threshold for C0/C2 as exemplified in FIG. 5B) (step 67). If the second FIFO threshold is less than the first FIFO threshold, the FIFO threshold in the HDAC 15 is switched into the second threshold (step 68A); otherwise, do not switch the FIFO threshold (step 68B).

After the FIFO setting has been completed, the CPU 10 is in C3/C4 state (step 69). Meanwhile, the HDA link 16 exits the reset state (step 70), which uncovers the codec 17 such that the HDA link 16 can function, Subsequently, in step 71, if the HDAC 15 detects active signal AZSDI or the amount of the FIFO is less than the threshold, the CPU 10 will exit from C3/C4 into C0/C2 (step 65); otherwise, the CPU 10 will remain in C3/C4 (i.e., the step 69).

According to the embodiment, the FIFO threshold may be dynamically set to distinct value based on whether the current power state is C0/C2 or C3/C4, and the CPU 10 therefore could stay more time in C3/C4, thereby saving more power and lengthening the operating time of a portable electronic device with limited power supply.

The present invention dynamically adjusts the threshold value of a data queue. What the present invention does is fundamentally different from that in the prior art, in which the threshold of the data queue, at most, is manually adjusted before it leaves the factory. For example, regarding a conventional FIFO with a FIFO size of 40 hDW and a threshold value of 31 hDW, before the FIFO leaves the factory, the threshold value may have been replaced with 19 hDW according to customer's requirement. To the contrary, in the claimed invention, the first threshold is a given value similar to that of the conventional FIFO, and the data unit of transportation and the time unit of transportation of the second threshold value, however, are obtained according to situations or states in use. That is, the second threshold is dynamically changed after it leaves the factory.

With respect to the hardware viewpoint, in one embodiment of the present invention, the DMA 150 may be integrated in the HDA controller 15. In another embodiment, however, the DMA 150 may be manufactured externally to the HDA controller 15. Further, in one embodiment, one FIFO corresponds to one DMA 150. In another embodiment, however, a number of FIFOs correspond to one DMA 150 such that the cost may be reduced.

Although specific embodiments have been illustrated and described, it will be appreciated by those skilled in the art that various modifications may be made without departing from the scope of the present invention, which is intended to be limited solely by the appended claims. For example, the present invention is adaptable to a general data queue that accesses the system memory in a system other than the HDA.

What is claimed is:

1. A system of dynamically switching queue threshold, comprising:

a data queue, having a first threshold and a second threshold, the data queue being dynamically switched between the first threshold and the second threshold according to different power state of a central processing unit (CPU), wherein the first threshold is greater than the second threshold;

wherein a system memory is requested to fill the data queue with data whenever amount of the data queue is less than the switched first/second threshold; and wherein the data queue is changed from the first threshold to the second threshold when the CPU changes from a first power state to a second power state, wherein the second power state saves more power than the first power state and the second threshold is equal to:

(data unit of transportation)*[(time required to change from the second/first power state into the first/second power state)/(time unit of transportation)]+n*(data unit of transportation)

where integer n is not less than 0.

2. The system of claim 1, wherein the data queue has the first threshold when the CPU is in C0 or C2 state; and the data queue has the second threshold when the CPU is in C3 or C4 state, wherein the states C0, C2, C3 and C4 are defined in Advanced Configuration and Power Interface (ACPI) specification.

3. The system of claim 2, further comprising a power management unit (PMU) for controlling the power state of the CPU.

4. The system of claim 1, wherein the n is controlled by three bits of a register, and n may be any integer between 0 and 7 inclusively.

5. The system of claim 1, wherein the data queue is first-in first-out buffer (FIFO), the system further including at least one direct memory access engine (DMA), wherein the FIFO corresponds to the at least one DMA, and the system memory is requested to fill the data queue via the at least one DMA.

6. The system of claim 5, further comprising a HDA link for connecting the DMA to one or more coder/decoders (codecs).

7. A method of dynamically switching queue threshold, comprising:

dynamically switching a data queue between a first threshold and a second threshold according to different power state of a central processing unit (CPU), wherein the first threshold is greater than the second threshold;

wherein a system memory is requested to fill the data queue with data whenever amount of the data queue is less than the switched first/second threshold; and wherein the data queue is changed from the first threshold to the second threshold when the CPU changes from a first power state to a second power state, wherein the second power state saves more power than the first power state and the second threshold is equal to:

(data unit of transportation)*[(time required to change from the second/first power state into the first/second power state)/(time unit of transportation)]+n*(data unit of transportation)

where integer n is not less than 0.

8. The method of claim 7, wherein the data queue has the first threshold when the CPU is in C0 or C2 state; and the data queue has the second threshold when the CPU is in C3 or C4 state, wherein the states C0, C2, C3 and C4 are defined in Advanced Configuration and Power Interface (ACPI) specification.

9. The method of claim 8, further comprising a step of using a power management unit (PMU) for controlling the power state of the CPU.

10. The method of claim 7, wherein the n is controlled by three bits of a register, and n may be any integer between 0 and 7 inclusively.

11. The method of claim 7, wherein the method is adaptable to a High Definition Audio (HDA) system, and the data queue is first-in first-out buffer (FIFO), the system further including a HDA controller that includes at least one direct memory access engine (DMA), wherein the FIFO corresponds to the at least one DMA.

12. The method of claim 11, wherein the CPU changes to C0 or C2 state, whenever the HDA controller becomes inactive, the CPU is in C3 or C4 state, and an input device inputs data, wherein the states C0, C2, C3 and C4 are defined in Advanced Configuration and Power Interface (ACPI) specification.

13. The method of claim 11, wherein the FIFO uses the second threshold, whenever the HDA controller becomes active and the HDA controller detects that the CPU is in C3 or C4 state, wherein states C3 and C4 are defined in Advanced Configuration and Power Interface (ACPI) specification.

14. The method of claim 13, when the second threshold is greater than the first threshold, the FIFO continues to use the first threshold.

15. The method of claim 14, wherein the CPU changes to C0 or C2 state, whenever an input device inputs data or amount of the FIFO is less than the second threshold, wherein states C0 and C2 are defined in Advanced Configuration and Power Interface (ACPI) specification.

16. The method of claim 13, wherein a power management unit (PMU) issues a signal PMU_C3/C4 to notify the HDA controller of the C3 or C4 state of the CPU.

* * * * *